W. T. CAMPBELL.

TIRE LOCK.

APPLICATION FILED JUNE 4, 1921.

Reissued May 30, 1922. 15,365.

INVENTOR

Walter T. Campbell

BY Bakewell & Church

ATTORNEYS

UNITED STATES PATENT OFFICE.

WALTER T. CAMPBELL, OF ST. LOUIS, MISSOURI.

TIRE LOCK.

15,365. Specification of Reissued Letters Patent. Reissued May 30, 1922.

Original No. 1,330,167, dated February 10, 1920, Serial No. 318,582, filed August 19, 1919. Application for reissue filed June 4, 1921. Serial No. 475,094.

*To all whom it may concern:*

Be it known that I, WALTER T. CAMPBELL, a citizen of the United States, residing at St. Louis, Missouri, have invented a certain new and useful Improvement in Tire Locks, of which the following is a full, clear, and exact description, such as will enable others skilled in the art to which it appertains to make and use the same.

This invention relates to locks for locking spare tires carried on motor vehicles.

One object of the invention is to provide a lock for the purpose mentioned which is so constructed that it is practically impossible to break or cut the lock or the strap which engages the tire, and in which the lock is so constructed that it is impossible to insert a tool or implement to cut or tamper with the lock or the lock bolt.

Another object is to provide a spare tire lock for vehicles in which the means that surrounds the tire and the tire carrier on the vehicle is so mounted that the vibration of the vehicle will not cause said means to chafe or cut the tire or rattle against the tire carrier.

And still another object of my invention is to provide a spare tire lock for vehicles comprising a means that surrounds or embraces the tire and the tire carrier on the vehicle, and a resilient element or device combined with said means in such a manner that it serves as a resilient backing for said means which permits said means to yield in the event an attempt is made to cut said means with a chisel or other cutting tool.

With the foregoing and other objects in view, I have produced an efficient embodiment of the invention, one form of which is illustrated in the accompanying drawing, in which:—

Figure 1:
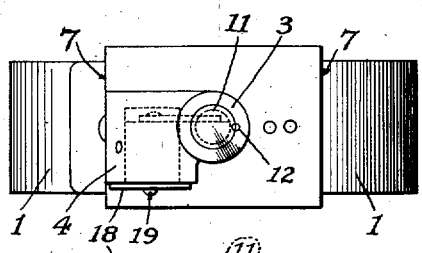
Figure 1 is a plan view of the lock.
Figure 2:
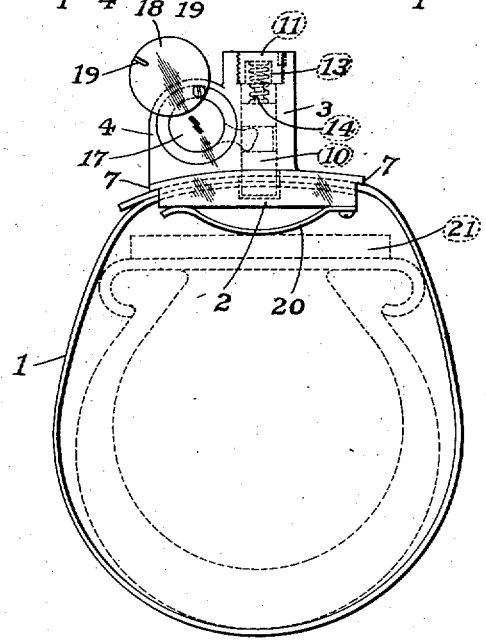
Figure 2 is a side or end elevation of the lock in service.

My invention comprises a flexible strap or band 1 which is preferably of very hard material, such, for instance, as alloy steel, so that it is impossible to cut or to break the band or strap. The invention comprises further, a novel locking device for engaging the band or strap for locking the same around the tire.

As shown, the lock comprises a case composed, preferably, of a casting or block of metal comprising a base 2, a portion 3 rising from the base and arranged to contain the lock bolt, and a portion 4 arranged to contain the mechanism controlling the lock bolt.

The base 2 of the lock case is provided with an arcuate or curved passage 5 therethrough, designed and adapted to receive the ends of the tire engaging band or strap 1. The extremities of the band or strap 1 are curved to the contour of the passage 5, and one end of the band or strap is secured or attached to the base 2 of the lock case. As shown, the end which is permanently secured to the lock case is held by rivets 6 which permit the other end of the strap or band to be inserted into and removed from the passage 5 when the lock bolt is disengaged therefrom.

The base of the lock case has an extended shoulder 7 at each side, which shoulders project beyond the lower portion of the base. This construction is important, in that the shoulders function to prevent the application of any cutting tool upon the strap 1 immediately above the ends of the base 2 of the lock case. For the reasons hereinafter described, it will be seen that if a cutting tool or other implement is placed upon the strap 1, the shoulders 7 hold such tool above yielding portions of the resilient strap; with the result that when the cutting tool is struck by a hammer the resiliency of the strap will throw the cutting tool off, and this will occur without material injury to the strap, due to the very hard nature thereof.

The upper wall of the passage 5, which is the concave wall of said passage, is formed with a number of shoulders or projections 8. These shoulders or projections 8 function to prevent the insertion of any tool or implement into the passage 5, thus preventing tampering with the lock bolt.

It is apparent that if it be attempted to insert a chisel or like implement into the passage 5, such chisel or implement will be obstructed by the shoulders or projections 8 and prevented from being driven into contact with the lock bolt.

The extended portion 3 of the lock case is formed with a chamber 9 in which the lock bolt 10 is operatively located. The end of the chamber 9 is closed by a closure 11 in the form of a hollow plug which is screwed into the chamber 9 and locked in position by a pin 12 driven into an opening formed by matching grooves in the wall of the closure 11 and in the adjacent portion of the lock case. The outer ends of the closure 11 and the lock pin 12 are flush with the surface of the lock case, so that said elements can not be engaged by any tool for the purpose of removing them.

The lock bolt 10 is actuated toward locking position by a spring 13 of the expansion type. The spring 13 is seated within the recess in the closure 11 and has its inner end encircling a projection 14 on the lock bolt, thereby holding said apparatus properly centered.

The end of the strap 1 which is attached permanently to the lock case has a hole therethrough in alignment with the chamber 9, so that the lock bolt 10 may be moved to and from locking position. When in locking position, the lock bolt 10 extends through the registering holes in the overlapping ends of the strap 1 and into a recess forming the continuation of the chamber 9 in the base of the lock case. In order that the strap 1 may be fitted around tires of different sizes, the detachable end of said strap is preferably formed with a number of holes therethrough, through one of which the lock bolt may be passed as determined by the size of the tire, encircled by the strap.

Figure 3:
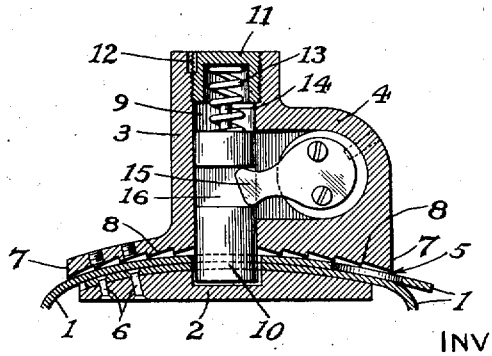
Figure 3 is a sectional view of the lock case, showing the locking mechanism, and the manner in which the lock bolt engages the tire engaging strap or band.

The lock bolt is movable from locking position by an arm or lever 15 engaging in an appropriate notch or recess 16 in the lock bolt. The arm or lever 15 is in connection with the barrel 17 of the locking mechanism. The locking mechanism may be of any appropriate construction that will function to lock the barrel in position to hold the arm or lever 15 in its lowered position, thus, locking the lock bolt 10 in the position shown in Figure 3. The lock is preferably of any known type adapted to be operated by a key and to permit removal of the key when the barrel of the lock is in position to hold the arm 15 in its lowered position.

A closure or guard 18 for the key hole may be provided, the same comprising a pivotally supported disk movable to and from position to close the key-hole, and preferably having a projection 19 for manual engagement.

The lock is preferably provided with a resilient element or device that performs two functions; to wit, it prevents the means that surrounds the tire and the tire supporting device on the vehicle from cutting or chafing the tire or rattling on said tire supporting device, and it forms a resilient backing for said means which permits said means to yield in the event an attempt is made to cut said means with a chisel or other cutting tool, as previously pointed out in the description of the shoulders 7 on the lock case. In the form of my invention herein illustrated the resilient element or device just referred to consists of a leaf spring 20 secured to the underside of the base of the lock case in such a way that it will bear against the tire carrier supporting device 21 on the vehicle, and thus be held in tension when the band 1 is drawn around the tire and the tire carrier and locked in position by the concealed key-controlled locking means in the lock case.

From the foregoing, it will be seen that I have provided a lock which is practically indestructible and incapable of injury by the usual means used for breaking locks. Due to the peculiar and novel construction of the co-operating parts, it is impossible to open the lock by tampering therewith, so that the lock can not be opened without the use of the proper key. The provision of the arcuate passage 5 with the shoulders 7 at the ends thereof and the projections 8 on the concave wall thereof makes it impossible either to cut or break the strap 1, or to insert a tool into the lock to release the lock bolt. When the lock is provided with a resilient device interposed between the tire carrier on the vehicle and the portion of the lock that surrounds the tire and tire carrier, it is impossible for said portion to cut or chafe the tire, rattle against the tire carrier or be cut by a blow or pressure applied to said portion.

I do not restrict myself to unessential details or features of construction, since it is apparent that variations may be made in the construction and arrangement of the lock without departure from the nature and principle of the invention.

What I claim and desire to secure by Letters Patent is:

1. A tire lock, comprising a lock case, a chamber in said case, a passage through the lock case intersecting said chamber intermediate of the ends of the chamber, a strap having both ends thereof extending into said passage and being overlapped and provided with holes registering with said chamber, an axially movable lock bolt in said chamber guided in its movements by the walls of said chamber and being movable into said holes to lock both ends of said strap together, and in connection with said lock case and being movable out of said holes to release said strap, an actuator for moving said lock bolt to locking position in said holes, and an arm engaging said lock bolt for locking the same in locking position and being movable to disengage said lock bolt from locking engagement with said strap.

2. A tire lock, comprising a lock case, an arcuate passage through the lock case, projections on the concave wall of said passage, a strap having one end permanently secured to the other wall of said passage, and having the other end thereof adapted to be inserted in said passage to overlap the secured end of said strap, the end portions of said strap having holes therethrough, a lock bolt in the lock case movable into and out of the holes in the end portions of said strap, and means for holding said lock bolt in locking position in the holes in the end portions of said strap.

3. A tire lock, comprising a lock case, an arcuate passage through the lock case, projections on the concave wall of said passage, a strap having one end thereof curved on the same radius of curvature as said passage and adapted to be inserted in said passage and having a hole therethrough, a lock bolt in the case movable into and out of said hole, and a locking arm operable to move said lock bolt out of said hole to release said strap.

4. A tire lock, comprising a lock case, an arcuate passage through the lock case, projections on the concave wall of said passage, a strap having one end permanently secured to said lock case and having the other end thereof curved on the same radius of curvature as said passage and adapted to be inserted in said passage, said curved end having a hole therethrough to receive the lock bolt, a chamber in the lock case, an axially movable lock bolt in said chamber, said bolt being guided in its movements by the walls of said chamber and being movable into and out of said hole in the strap, a locking arm operable to move said lock bolt out of said hole to release said strap, and a spring in said case actuating said lock bolt towards locking position.

5. A tire lock, comprising a lock case, a passage through said case, a strap having one end attached to said case and the other end being insertible in and removable from said passage, a lock bolt in said case movable into and out of locking engagement with the end of said strap when said end is in said passage, and shoulders on said lock case at one side of said passage and extending relatively a considerable distance beyond that portion of the lock case at the other side of said passage.

6. A tire lock, comprising a lock case, an arcuate passage through said lock case, projections on the concave wall of said passage, shoulders on said lock case on the same side of said passage with said projections, and extending beyond that portion of the lock case at the other side of said passage, a strap having end portions extending into said passage and one of said end portions being removable from said passage, and a lock bolt in said case movable into and out of locking engagement with the portions of said strap which are in said passage.

7. A tire lock, comprising a lock case, an arcuate passage through said lock case, shoulders on said lock case on the same side of said passage with the concave wall of said passage and extending outwardly beyond that portion of the lock case at the other side of said passage, a strap having end portions extending into said passage and one of said end portions being removable from said passage, and a lock bolt in said case being movable into and out of locking engagement with the portions of said strap which are in said passage.

8. A spare tire lock for vehicles, comprising a means that is adapted to surround the tire and the tire carrier on the vehicle, a lock for securing said means in operative position, and a resilient element combined with said means in such a manner that it prevents said means from chafing the tire or rattling against a metallic part of the structure with which the tire lock is used.

9. A spare tire lock for vehicles, comprising a flexible member that is adapted to be passed around a spare tire and the tire carrier on the vehicle, a lock case connected to one end portion of said flexible member and adapted to receive the free end portion of said member, a concealed key-controlled locking device in said lock case for securing the free end of said member, and a resilient device on the underside of said lock case that is adapted to bear against the tire carrier, for the purpose described.

10. A spare tire lock for vehicles consisting of a flexible, indestructible member adapted to be passed around the tire and the tire carrier on the vehicle and formed from a flat strip or band of metal, a solid block of metal permanently connected to one end portion of said flexible member and having a passageway into which the free end of said flexible member is adapted to be inserted, a concealed device in said block adapted to pass through a hole in the free end of said flexible member to lock same, and a key-controlled means in said lock for rendering said locking device operative and inoperative.

11. A spare tire lock for vehicles, comprising a flexible, indestructible band that is adapted to be passed around a spare tire and the tire carrier on the vehicle, a lock case embracing one end portion of said band and permanently connected to same and having a passageway into which the free end of said band is adapted to be inserted and arranged in overlapping relation with the other end portion of the band, and a concealed key-controlled locking device in said band that is adapted to pass through aligned holes in the overlapped portions of said band.

12. A spare tire lock for vehicles, comprising an indestructible, flexible member that is adapted to be passed around a tire and the carrier on which it is mounted, a lock case having a passageway that is adapted to receive and hold the end portions of said flexible member in overlapping relation, a concealed key-controlled locking means in said lock case adapted to pass through the overlapped portions of said member, and a resilient device on said lock case that is adapted to engage the tire carrier, for the purpose described.

WALTER T. CAMPBELL.